US009930555B2

(12) United States Patent
Zhang et al.

(10) Patent No.: US 9,930,555 B2
(45) Date of Patent: Mar. 27, 2018

(54) METHOD AND SYSTEM OF MEASURING COMMUNICATION QUALITY

(71) Applicant: SoftBank Corp., Tokyo (JP)

(72) Inventors: Liang Zhang, Tokyo (JP); Takao Okamawari, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 99 days.

(21) Appl. No.: 14/911,531

(22) PCT Filed: Jan. 21, 2015

(86) PCT No.: PCT/JP2015/051452
§ 371 (c)(1),
(2) Date: Feb. 11, 2016

(87) PCT Pub. No.: WO2016/117043
PCT Pub. Date: Jul. 28, 2016

(65) Prior Publication Data
US 2016/0360436 A1    Dec. 8, 2016

(51) Int. Cl.
*H04L 1/00*         (2006.01)
*H04W 24/10*       (2009.01)
(Continued)

(52) U.S. Cl.
CPC .............. *H04W 24/10* (2013.01); *H04W 8/22* (2013.01); *H04W 88/02* (2013.01); *H04W 24/08* (2013.01)

(58) Field of Classification Search
CPC ....... H04W 24/10; H04W 24/08; H04W 8/22; H04W 88/02
(Continued)

(56) References Cited

U.S. PATENT DOCUMENTS

2010/0157991 A1*   6/2010   Kim .................. H04M 3/42221
                                                                  370/352
2013/0178216 A1    7/2013   Chang et al.
(Continued)

FOREIGN PATENT DOCUMENTS

JP       2014-509165 A      4/2014
WO    WO 2012/039439 A1    3/2012
WO    WO 2013/108819 A1    7/2013

OTHER PUBLICATIONS

International Telecommunication Union, "Series P: Telephone Transmission Quality, Telephone Installations, Local Line Networks—Methods for objective and subjective assessment of quality," ITU-T Recommendation P.862, Feb. 2001.
(Continued)

*Primary Examiner* — Faisal Choudhury
(74) *Attorney, Agent, or Firm* — Muirhead and Saturnelli, LLC

(57) ABSTRACT

Methods and systems of measuring communication quality in a communication via a mobile communication network are provided. A connection status of a communication terminal apparatus to a mobile communication network is confirmed when a timing of transmitting a measurement data of the communication terminal apparatus side from the communication terminal apparatus to a server comes. The measurement data is transmitted from the communication apparatus to the server when determining that it is a status capable of transceiving the measurement data, based on the confirmation result of connection status, and the measurement data is not transmitted from the communication terminal apparatus to the server when determining it is not a status capable of transceiving the measurement data. A communication quality in the communication via the mobile communication network is measured based on the measure-
(Continued)

ment data received by the server from the communication terminal apparatus.

20 Claims, 7 Drawing Sheets

(51) Int. Cl.
    *H04W 88/02*     (2009.01)
    *H04W 8/22*     (2009.01)
    *H04W 24/08*     (2009.01)

(58) Field of Classification Search
    USPC .......................................................... 370/252
    See application file for complete search history.

(56) References Cited

U.S. PATENT DOCUMENTS

| | | |
|---|---|---|
| 2014/0022910 A1 | 1/2014 | Zhang et al. |
| 2016/0077901 A1* | 3/2016 | Roth .................. G06F 9/45529 |
| | | 719/328 |

OTHER PUBLICATIONS

International Telecommunication Union, "Series P: Terminals and Subjective and Objective Assessment Methods—Methods for objective and subjective assessment of speech quality," Recommendation ITU-T P.863, Jan. 2011.

* cited by examiner

METHOD AND SYSTEM OF MEASURING COMMUNICATION QUALITY

TECHNICAL FIELD

The present invention relates to methods and systems of measuring quality of communication via a mobile communication network.

BACKGROUND ART

A communication quality measurement method performing a communication of outgoing a d incoming via a mobile communication network is conventionally known, in which measurement condition such as a predetermined given time and location of measurement is informed to a measurer in advance and the communication for measurements is conducted by the measurer with operating a mobile telephone (communication terminal apparatus) at the given location and time for measurements. In this method, based on communication logs constantly recorded in the mobile telephone operated by the measurer, measurement data when conducting the aforementioned communication of outgoing and incoming are extracted and acquired, and an index value (e.g. a connection rate) of communication quality is calculated from the acquired measurement data.

As an index value of communication quality, for example, a MOS (Mean Opinion Scores) value indicating voice quality in a voice communication is also known, which is standardized in Non-Patent Literature 1, Non-Patent Literature 2 and the like. This MOS value is a computed value corresponding to an average value of scores on five-grade evaluation by a large number of persons based on comparison results between a voice to be evaluated and a voice of a reference sound source.

CITATION LIST

Non-Patent Literature

Non-Patent Literature 1: "Perceptual evaluation of speech quality (PESQ): An objective method for end-to-end speech quality assessment of narrow-band telephone networks and speech codecs", SERIES P: TELEPHONE TRANSMISSION QUALITY, TELEPHONE INSTALLATIONS, LOCAL LINE NETWORKS, Methods for objective and subjective assessment of quality, TELECOMMUNICATION STANDARDIZATION SECTOR OF ITU, ITU-T Recommendation P. 862 (02/2001).
Non-Patent Literature 2: "Perceptual objective listening quality assessment", SERIES P: ERMINALS AND SUBJECTIVE AND OBJECTIVE ASSESSMENT METHODS, Methods for objective and subjective assessment of speech quality, TELECOMMUNICATION STANDARDIZATION SECTOR OF ITU, ITU-T Recommendation P. 863 (01/2011).

SUMMARY OF INVENTION

Technical Problem

There is a case that, in order to measure the foregoing communication quality, a terminal-side measurement data including communication log information recorded by a communication terminal apparatus is transmitted from the communication terminal apparatus to a server via a mobile communication network and the server calculate an index of communication quality such as a voice quality, connection rate and so on by using the measurement data received from the communication terminal apparatus. In the case of transmitting the terminal-side measurement data from the communication terminal apparatus in this way, there is a fear that the server is not capable of surely acquiring the measurement data.

Solution to Problem

A method of measuring communication quality according to an aspect of the present invention comprises confirming a connection status of a communication terminal apparatus to a mobile communication network when a timing of transmitting a measurement data of the communication terminal apparatus side from the communication terminal apparatus to a server comes, wherein the measurement data is used for a communication quality measurement of a communication via the mobile communication network by the communication terminal apparatus; transmitting the measurement data from the communication apparatus to the server when determining that it is a status capable of transceiving the measurement data, based on the confirmation result of connection status, while not transmitting the measurement data from the communication terminal apparatus to the server when determining it is not a status capable of transceiving the measurement data; and measuring a communication quality in the communication via the mobile communication network based on the measurement data received by the server from the communication terminal apparatus.

In the foregoing method, the communication quality in the communication via the mobile communication network may be measured based on the measurement data of the communication terminal apparatus side received by the server from the communication terminal apparatus and a measurement data of the server side used for a communication quality measurement of a communication by the communication terminal apparatus via the mobile communication network.

Furthermore, the foregoing method may comprise confirming the connection status of the communication terminal apparatus to a mobile communication network when a re-transmitting timing for performing a re-transmitting process of the measurement data comes, in case that the measurement data of communication terminal side is not transmitted from the communication terminal apparatus to the server; and performing the re-transmitting process of the measurement data from the communication terminal apparatus to the server when determining it is a status capable of transceiving the measurement data based on the confirmation result of connection status, while not performing the re-transmitting process of the measurement data from the communication terminal apparatus to the server when determining it is not a status capable of transceiving the measurement data.

Moreover, the foregoing method may comprise confirming the connection status based on at least one kind of information on a power ON/OFF of the communication terminal apparatus, information on an operation mode (for example, airplane mode) of the communication terminal apparatus and information on intensity (for example, electric field intensity) of a radio signal from the mobile communication network.

Further, the foregoing method may comprise requesting the measurement data of communication terminal apparatus side from the server to the communication terminal apparatus and transmitting the measurement data from the terminal apparatus to the server.

Furthermore, the foregoing method may comprise confirming whether the measurement data reaches to the server from the communication terminal apparatus or not when a predetermined time elapses from the timing of transmitting the measurement data of communication terminal apparatus side and requesting the measurement data from the server to the communication terminal apparatus when the measurement data is not reached.

Moreover, the foregoing method may comprise delivering information including a measurement condition for measuring communication quality, performing a communication via the mobile communication network by the communication terminal apparatus at the timing satisfying the measurement condition, and recording the measurement data of communication terminal apparatus side corresponding to the communication at the predetermined timing by the communication terminal apparatus.

Further, in the foregoing method, measuring the communication quality may comprise calculating the index value of communication quality, and the measurement condition of communication quality may comprise at least one kind of information on a measurement schedule designating a time of measuring the communication quality, a measurement area designating a location of the communication terminal apparatus when measuring the communication quality and a moving speed in measurement designating a moving speed of the communication terminal apparatus when measuring the communication quality.

Furthermore, in the foregoing method, the foregoing information of delivery target may comprise measurement contents designating a type of index value of communication quality to be measured.

Moreover, in the foregoing method, measuring the communication quality may comprise calculating the index value of communication quality and the index value of communication quality may be at least one of a successful connection rate, a failed connection rate, an out-of-service rate, an airplane-mode rate, an apparatus-failure rate, a power-off rate, a presence or absence of forcible disconnection, a value of evaluation result of voice quality and an error rate of the communication terminal apparatus in the mobile communication network.

Further, in the foregoing method, the communication of measuring the communication quality may be a voice communication via the mobile communication network or a data communication via the mobile communication network.

In the foregoing method, the foregoing communication quality may be measured with respect to both of an outgoing communication from the communication terminal apparatus and an incoming communication to the communication terminal apparatus.

A system of measuring communication quality according to another aspect of the present invention comprises a communication terminal apparatus used for a communication via a mobile communication network and a server. The communication terminal apparatus comprises means of confirming a connection status of the communication terminal apparatus to the mobile communication network when a timing of transmitting a measurement data of the communication terminal apparatus side from the communication terminal apparatus to the server comes, wherein the measurement data is used for a communication quality measurement of a communication via the mobile communication network by the communication terminal apparatus; means of transmitting the measurement data from the communication terminal apparatus to the server when determining that it is a status capable of transceiving the measurement data, based on the confirmation result of connection status, while not transmitting the measurement data from the communication terminal apparatus to the server when determining it is not a status capable of transceiving the measurement data; and means of measuring a communication quality in the communication via the mobile communication network based on the measurement data received by the server from the communication terminal apparatus.

In the foregoing system, the server may measure the communication quality in the communication via the mobile communication network based on the measurement data of the communication terminal apparatus side received by the server from the communication terminal apparatus and a measurement data of the server side used for a communication quality measurement of a communication by the communication terminal apparatus via the mobile communication network.

Furthermore, in the foregoing system, the communication terminal apparatus may comprise means of confirming the connection status of the communication terminal apparatus to the mobile communication network when a re-transmitting timing for performing a re-transmitting process of the measurement data comes, in case that the measurement data of communication terminal side is not transmitted from the communication terminal apparatus to the server; and performing the re-transmitting process of the measurement data from the communication terminal apparatus to the server when determining it is a status capable of transceiving the measurement data based on the confirmation result of connection status, while not performing the re-transmitting process of the measurement data from the communication terminal apparatus to the server when determining it is not a status capable of transceiving the measurement data.

Moreover, in the foregoing system, the communication terminal apparatus may confirm the connection status based on at least one kind of information on a power ON/OFF of the communication terminal apparatus, information on an operation mode (for example, airplane mode) of the communication terminal apparatus and information on intensity (for example, electric field intensity) of a radio signal from the mobile communication network.

Further, in the foregoing system, the server may comprise means of requesting the measurement data of communication terminal apparatus side to the communication terminal apparatus, and the communication terminal apparatus may comprise means of transmitting the measurement data to the server based on the request.

Furthermore, in the foregoing system, the server may comprise means of confirming whether the measurement data reaches to the server from the communication terminal apparatus or not when a predetermined time elapses from the timing of transmitting the measurement data of communication terminal apparatus side and the measurement data may be requested from the server to the communication terminal apparatus when the measurement data is not reached.

Moreover, in the foregoing system may further comprise means of delivering information including a measurement condition for measuring communication quality, the communication terminal apparatus may comprise means of performing a communication via the mobile communication network by the communication terminal apparatus at the timing satisfying the measurement condition and means of recording the measurement data of communication terminal apparatus side corresponding to the communication at the predetermined timing.

Further, in the foregoing system, the measurement condition of communication quality may comprise at least one kind of information on a measurement schedule designating a time of measuring the communication quality, a measurement area designating a location of the communication terminal apparatus when measuring the communication quality and a moving speed in measurement designating a moving speed of the communication terminal apparatus when measuring the communication quality.

Furthermore, in the foregoing system, the server may comprise means of calculating a index value of communication quality and the index value of communication quality may be at least one of a successful connection rate, a failed connection rate, an out-of-service rate, an airplane-mode rate, an apparatus-failure rate, a power-off rate, a presence or absence of forcible disconnection, a value of evaluation result of voice quality and an error rate of the communication terminal apparatus in the mobile communication network.

Moreover, in the foregoing system, the communication of measuring the communication quality may be a voice communication or a data communication via the mobile communication network.

Advantageous Effects of Invention

According to the present invention, it is capable of avoiding useless transmission of measurement data to a server from a communication terminal apparatus when a possibility of failure of transceiving measurement data of communication terminal apparatus side used for communication quality measurements is high, and capable of surely acquiring measurement data of communication terminal apparatus side used for communication quality measurements by the server from a communication terminal apparatus.

DESCRIPTION OF EMBODIMENTS

Hereinafter, embodiments of the present invention are described with reference to the drawings.

Figure 1:
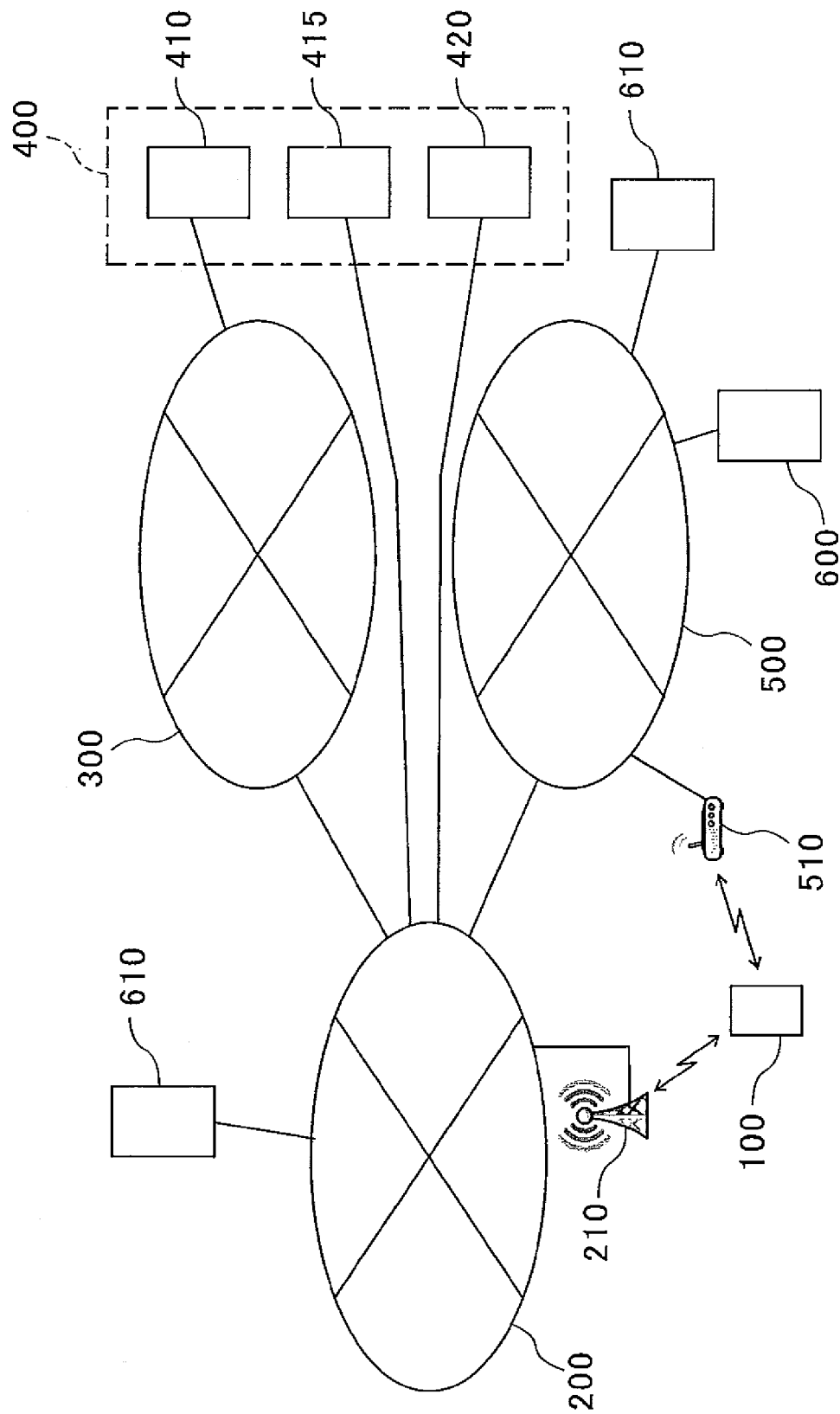
FIG. 1 is a schematic diagram showing one example of main part configuration of an overall communication system with a communication quality measurement system according to an embodiment of the present invention.

FIG. 1 is a schematic diagram showing one example of main part configuration of an overall communication system with a communication quality measurement system according to an embodiment of the present invention. In FIG. 1, the communication system of this embodiment includes a communication terminal apparatus 100 capable of being used by a user, and a communication quality measurement system 400 of performing a process relating to communication quality evaluation for a voice communication and/or a data communications via a mobile communication network (mobile telephone network) 200 by using the communication terminal apparatus 100. The communication quality measurement system 400 may be configured with a single server or a network apparatus, or may be configured by combining with a plurality of servers and/or network apparatuses.

The communication quality measurement system 400 exemplified in FIG. 1 is provided with an automatic voice response apparatus 410 and a delivery and analysis server 420 being a first server, as network-side apparatuses. The communication quality measurement system 400 may be provided with a data communication service providing server (hereinafter called as "data communication server") 415 being a second server. The automatic voice response apparatus 410 and data communication server 415 are network-side communication apparatuses (network apparatuses) capable of communicating with the communication terminal apparatus 100 and recording a predetermined network-side communication log.

The communication terminal apparatus 100 is capable of performing a voice communication with the automatic voice response apparatus 410 of communication quality measurement system 400 and/or other communication terminal apparatus etc. via a circuit switched network of the mobile communication network 200 including a base station 210 or via the circuit switched network and a fixed-telephone network 300.

Furthermore, the communication terminal apparatus 100 is capable of transmitting a measurement data of communication terminal apparatus side (hereinafter called as "terminal-side measurement data) including communication log information used for communication quality measurements to the delivery and analysis server 420 and/or receiving information delivery of measurement condition such as a measurement schedule, a measurement contents or the like from the delivery and analysis server 420, via the mobile communication network 200.

Moreover, the communication terminal apparatus 100 is capable of performing a voice communication by a VoIP (Voice over Internet Protocol), a VoLTE (Voice over LTE) or the like, performing a Web communication, a streaming or the like and/or performing various data communications, with the data communication server 415 and/or other communication terminal apparatuses via a packet switching network of the mobile communication network 200 or via a packet switching network and the Internet 500.

Further, the communication terminal apparatus 100 is capable of accessing the Internet 500 via the foregoing mobile communication network 200 including the base station 210 or via an access-point apparatus 510 of a wireless LAN such as WiFi (Wireless Fidelity) and so on, and transceiving various data to and from the delivery and analysis server 420 and/or downloading contents such as music and so on from a contents providing server 600.

The communication terminal apparatus 100 is, for example, a tablet PC or a mobile communication terminal capable of performing a voice communication such as a mobile telephone, a smartphone, a PHS or the like, and capable of performing a voice communication and/or a data communication with a communication destination via the mobile communication network 200 that includes a base station being as a wireless relaying apparatus, switching equipment or the like.

For example, when existing in a cell being as a wireless communication area of the mobile communication network 200, the communication terminal apparatus 100 is capable of performing a voice communication with a communication terminal apparatus such as a tablet PC, a mobile communication terminal such as a mobile telephone, a smartphone, a PHS, etc. which exists in a cell of other mobile communication network.

Further, when exiting in a cell of the mobile communication network 200, the communication terminal apparatus 100 is capable of performing a voice communication with the automatic voice response apparatus 410 being as a voice communication destination of the communication quality measurement system 400 via the fixed-telephone network 300 and/or performing a data communication (including a VoIP or VoLTE call) with the data communication server 415 and/or the delivery and analysis server 420 of the communication quality measurement system 400 via the Internet 500.

In the description herein, the foregoing cell of the mobile communication network 200 is, for example, any one of various cells that are different in size between themselves, such as a macro cell, a micro cell, a femto cell, a pico cell or the like.

The communication terminal apparatus 100 is configured with, for example, a wireless signal processing section including an antenna, a transmitting amplifier, a receiving amplifier, a communication chip set, etc., a baseband signal processing section, an application execution management section, a voice input device including a small-size microphone, a voice output device including a speaker, a receiver, a vibration generator or the like, a display section such as an LCD being as display means, a main controller and so on. Furthermore, the communication terminal apparatus 100 includes a GPS receiving section that acquires information on its own current location by using the GPS (Global Positioning System), being as current location acquiring means. The communication terminal apparatus 100 may include an imaging section configured with a camera device such as a CCD, a CMOS device or the like, and an attitude detecting section configured with a gyro sensor, an acceleration sensor, a magnetic sensor or the like.

The main controller is configured with, for example, a microprocessor such as an MPU (Micro Processing Unit) and memories such as a RAM, a ROM etc., and controls respective sections based on a predetermined control program implemented in advance. For example, by executing the predetermined control program, the main controller is capable of performing a process of a voice communication with the automatic voice response apparatus 410 via the mobile communication network 200 and the fixed-telephone network 300 and a control of the voice communication, performing a process of extracting a received voice data of test voice signal based on the received signal from the automatic voice response apparatus 410 as a received voice data (digital signal) encoded by a predetermined compressing/coding scheme, performing a process of transmitting and receiving of various data to and from the server (delivery and analysis server 420, data communication server 415) via the mobile communication network 200 and the Internet 500 and a control of the transmitting and receiving, performing a download of contents such as music from the contents providing server 600 and a control of the download, performing a process of determining presence or absence of an abnormal disconnection, and so on.

The foregoing compressing/coding scheme for the received voice data includes, for example, GSM (registered trademark) (Global System for Mobile communications) AMR (Adaptive Multi-Rate) Codec/ACELP (Algebraic Code Excited Linear Prediction) compression (bit rate: 4.75 [kbps]-12.2 [kbps]). A file of the received voice data (digital) compressed and encoded in this way is capable of having a data amount of about one-tenth of a recorded audio file (e. g. WAV format file) obtained from the received voice data.

Moreover, the communication terminal apparatus 100 is capable of executing various application programs on a native environment of the main controller and/or executing various application programs on a virtual environment established by the application executing management section. In the description herein, the "application" (hereinafter abbreviated as "app" as appropriate) means a software capable of being applied to each of various uses such as a telephone, recording, browser, camera, search, mail, information delivery, calendar, clock, music playback, map display, data folder, message communication, video playback and so on, as well as a communication quality measurement processing, and is also called "application software". The "application" is an aggregation of files of executive programs developed with various computer languages and files of setting information, image, etc. that are used and/or referred when executing the program or in other timing.

The application execution management section manages, for example, program modules and libraries that are used for executing the applications. Moreover, the application execution management section establishes a framework (for example, an Android framework, an iOS framework, etc.) or a virtual execution environment (virtual machine) such as a Dalvik (registered trademark) VM, a Java VM, etc., which are used for any one, two or more than two of plural kinds of applications such as an Android (registered trademark) application, an iOS (registered trademark) application, a Windows (registered trademark) application, a Java (registered trademark) application and so on. The application execution management section is configured to have a multitasking function so as to execute a plurality of applications in parallel.

In the communication terminal apparatus 100, the foregoing main control apparatus functions as each of the following means by reading out and executing a predetermined program and cooperating with each of other sections.

For example, in the communication terminal apparatus 100, the foregoing main control apparatus functions as a means of confirming a connection status of the communication terminal apparatus 100 to the mobile communication network 200 when a timing of transmitting the terminal side measurement data to the delivery and analysis server 420 comes, wherein the terminal side measurement data is used for a communication quality measurement of a communication via the mobile communication network 200 by the communication terminal apparatus 100. The foregoing main control apparatus also functions as a means of transmitting the measurement data from the communication terminal apparatus 100 to the delivery and analysis server 420 when determining that it is a status capable of transceiving the terminal side measurement data, based on the confirmation result of connection status, while not transmitting the measurement data from the communication terminal apparatus 100 to the delivery and analysis server 420 when determining it is not a status capable of transceiving the measurement data.

Furthermore, in the communication terminal apparatus 100, the foregoing main control apparatus functions as a means of confirming the connection status of the communication terminal apparatus 100 to the mobile communication network 200 when a re-transmitting timing for performing a re-transmitting process of the measurement data comes, in case that the measurement data of terminal side is not transmitted to the delivery and analysis server 420. The foregoing main control apparatus also functions as a means of performing the re-transmitting process of the measurement data from the communication terminal apparatus 100 to the delivery and analysis server 420 when determining it is a status capable of transceiving the measurement data based on the confirmation result of connection status, while not performing the re-transmitting process of the measurement data from the communication terminal apparatus 100 to the delivery and analysis server 420 when determining it is not a status capable of transceiving the measurement data.

Moreover, in the communication terminal apparatus 100, the foregoing main control apparatus functions as a means of transmitting the terminal side measurement data to the delivery and analysis server 420 based on a request received from the delivery and analysis server 420. The foregoing main control apparatus also functions as a means of performing a communication via the mobile communication network 200 at a predetermined timing satisfying measurement condition received from the delivery and analysis server 420 and a means of recording the terminal side measurement data corresponding to the communication at the predetermined timing.

The delivery and analysis server 420 stores information on measurement condition such as a measurement schedule designating time of executing a communication quality measurement, etc. and/or information on measurement contents designating a type of index value of communication quality to be measured, and performs a management processing such as new registration, modification, deletion, etc. of the information on measurement condition and/or the measurement contents.

The delivery and analysis server 420 functions as a means of delivering information including the measurement condition and/or measurement contents of communication quality to the communication terminal apparatus 100 capable of communicating via the mobile communication network 200. Moreover, the delivery and analysis server 420 functions also as a means of delivering information including the measurement condition and/or measurement contents of communication quality to each of the automatic voice response apparatus 410 and the data communication server 415.

For example, the delivery and analysis server 420 is capable of delivering information on measurement condition such as the latest measurement schedule to the communication terminal apparatus 100 via the mobile communication network 200, at a predetermined timing that is set in advance or an arbitrary timing. In this case, the communication terminal apparatus 100 performs a communication with the automatic voice response apparatus 410 or the data communication server 415 via the mobile communication network 200, at the predetermined timing that satisfies the measurement condition received from the delivery and analysis server 420.

Furthermore, the delivery and analysis server 420 is capable of delivering information including measurement condition such as the latest measurement schedule to each of the automatic voice response apparatus 410 and the data communication server 415 via the mobile communication network 200 or other leased line, at a predetermined timing that is set in advance or an arbitrary timing. In this case, the automatic voice response apparatus 410 and the data communication server 415 perform a communication with the communication terminal apparatus 100 via the mobile communication network 200, at the predetermined timing that satisfies the measurement condition received from the delivery and analysis server 420.

The foregoing measurement condition may be other condition such as a measurement area designating a location of the communication terminal apparatus when performing a communication quality measurement, a moving speed in measurement designating a moving speed of the communication terminal apparatus when performing the communication quality measurement or the like, as well as the measurement schedule designating time for performing the communication quality measurement. Moreover, together with the foregoing measurement condition, a measurement contents designating a type of the index value of communication quality to be measured may be delivered. In this description herein, the index value of communication quality may be at least one of a successful connection rate, a failed connection rate, an out-of-service rate, an airplane-mode rate, an apparatus-failure rate, a power-off rate, a value showing presence or absence of forcible disconnection (Call Drop) during communication, a value of voice quality showing an evaluation result of voice quality (MOS value described below) and an error rate (block error rate, bit error rate, packet loss rate, etc.) during communication of communication terminal apparatuses in the mobile communication network.

The foregoing measurement condition and measurement contents may be set based on various kinds of information. For example, the measurement condition may be set based on at least one of a communication history of the communication terminal apparatus 100, a type/model of the communication terminal apparatus 100, a current location (GPS position, area, serving cell, etc.) of the communication terminal apparatus 100, a time period (a weekday/holyday, day of week, early morning/daytime/nighttime), a moving speed (for example, low speed during moving on foot, high speed during moving by car, train or the like) of the communication terminal apparatus, information on a communications service provider of the mobile communication network 200 and communication quality (for example, receiving SINR) in the communication terminal apparatus 100. The system may be configured so as to have an automatic learning function capable of being updated by successively learning the measurement condition set in this way described above, and the measurement condition used in the immediately previous measurement may be preferentially delivered as the measurement condition used in the next measurement of communication quality.

The automatic voice response apparatus 410 is configured to be capable of communicating with the communication terminal apparatus 100 via the switching network of the mobile communication network 200 and the fixed-telephone network 300. Further, the automatic voice response apparatus 410 is configured to be capable of communicating with the delivery and analysis server 420 via the mobile communication network 200 or other leased line.

The automatic voice response apparatus 410 functions as a means of performing a voice communication with the communication terminal apparatus 100 via the mobile communication network 200 at the predetermined timing that satisfies the above-described measurement condition.

For example, the automatic voice response apparatus 410 performs an automatic voice response of transmitting a test signal for measurements of voice communication (for evaluation of voice communication) to the communication terminal apparatus 100, in response to an outgoing call of normal voice communication from the communication terminal apparatus 100 which is transmitted at a predetermined timing that satisfies the foregoing measurement condition.

The automatic voice response apparatus 410 may perform an automatic outgoing call of normal voice communication to the communication terminal apparatus 100 at the predetermined timing that satisfies the foregoing measurement condition and transmit a test signal for measurements of voice communication (for evaluation of voice communication) to the communication terminal apparatus 100 that responds to the automatic outgoing call.

The data communication server 415 is configured to be capable of communicating with the communication terminal apparatus 100 via the packet switching network of the mobile communication network 200, or via the packet switching network and the Internet 500. Furthermore, the data communication server 415 is configured to be capable of communicating with the delivery and analysis server 420 via the mobile communication network 200 or other leased line.

The data communication server 415 functions as a means of performing a data communication with the communication terminal apparatus 100 via the mobile communication network 200 at the predetermined timing that satisfies the foregoing measurement condition.

For example, the data communication server 415 performs an automatic voice response of transmitting a test signal for measurements of voice communication (for evaluation of voice communication) to the communication terminal apparatus 100, in response to an outgoing call of voice communication by VoIP, VoLTE, etc. from the communication terminal apparatus 100 transmitting at the foregoing predetermined timing. Moreover, the data communication server 415 also transmits a test data for measurements of communication quality in response to an acquisition request for the test data transmitted from the communication terminal apparatus 100 at the foregoing predetermined timing.

It is noted that the data communication server 415 may transmit the test signal for measurements of voice communication (for evaluation of voice communication) by VoIP, VoLTE, etc. or the test data for measurements of communication quality to the communication terminal apparatus 100 at a predetermined timing that satisfies the foregoing measurement condition, by a push-type communication to the communication terminal apparatus 100.

Moreover, the communication terminal apparatus 100, the automatic voice response apparatus 410, the data communication server 415 and the communication quality measurement server 420 are in a state of mutual time synchronization. For example, each of the communication terminal apparatus 100, automatic voice response apparatus 410, data communication server 415 and communication quality measurement server 420 is capable of performing a time synchronization processing by communicating with an NTP (Network Time Protocol) server 610 connected to the mobile communication network 200 or the Internet 500. The time synchronization processing in each of the apparatuses 100, 410 and servers 415, 420 may be performed by receiving GPS signals or by other methods.

The delivery and analysis server 420 is configured to be capable of communicating with the communication terminal apparatus 100 via the packet switching network of the mobile communication network 200, or via the packet switching network and the Internet 500. Further, the delivery and analysis server 420 is also configured to be capable of communicating with the automatic voice response apparatus 410 and the data communication server 415 via the mobile communication network 200 or other leased line.

The delivery and analysis server 420 is capable of performing various processes relating to the evaluation of communication quality in a communication via the mobile communication network 200.

For example, the delivery and analysis server 420 functions as a means of acquiring at least one of a terminal-side measurement data including terminal-status log information at the predetermined timing that satisfies the foregoing measurement condition recorded in the communication terminal apparatus 100 and a measurement data of communication network side (hereinafter called as "network-side measurement data") including terminal-existing serving-base-station quality information corresponding to a communication at the predetermined timing.

Moreover, the delivery and analysis server 420 functions as a means of calculating an index value of communication quality in a communication via the mobile communication network 200, based on at least one of the terminal-side measurement data and the network-side measurement data.

Furthermore, the delivery and analysis server 420 also functions as a means of requesting the terminal side measurement data to the communication terminal apparatus 100, and a means of confirming whether the terminal side measurement data reaches from the communication terminal apparatus 100 or not when a predetermined time elapses from the timing of transmitting the terminal side measurement data and a means of delivering information including a measurement condition for measuring communication quality.

Table 1 is a list showing one example of the terminal-side measurement data capable of being obtained from the communication terminal apparatus 100.

TABLE 1

| Category | Item | Contents |
| --- | --- | --- |
| Measurement schedule | Measurement time | Starting time, Ending time |
| | Measurement location | Latitude, Longitude |
| | Schedule ID | Schedule management number |
| Terminal information | Terminal identification number (IMEI) | |
| | Type/model of terminal | |
| | Operating system (OS) | |
| | Carrier information | |

TABLE 1-continued

| Category | Item | Contents |
|---|---|---|
| Measurement contents | Telephone number Moving speed Voice communication quality | Connection rate of voice communication, Voice quality |
| | Data communication quality | Connection rate of data communication, Communication speed |
| | Measurement direction | Outgoing from terminal, Incoming to terminal |
| Measurement result | Result of voice communication quality | Voice quality value, Recorded audio file, Connection history of voice communication |
| | Result of data communication quality | Connection history of data communication, Throughput value |
| Terminal-status log information | (Refer to Table 2) | |
| Terminal-existing serving-base-station quality information | (Refer to Table 3) | |

In the description herein, the "recorded audio file" in Table 1 is a file created by recording a test voice signal including a test signal received from the automatic voice response apparatus 410 or the data communication server 415. The "voice quality value" in Table 1 is an evaluation value of voice quality such as a MOS (Mean Opinion Scores) value or the like calculated based on the recorded audio file and a sound source file of the test voice signal (refer to Non-Patent Literatures 1 and 2). In Table 1, the "connection rate of voice communication" is a value of successful connection count of voice communications divided by total connection count of performing voice communications, and the "connection rate of data communication" is a value of successful connection count of data communications divided by total connection count of performing data communications.

Table 2 is a list showing one example of the terminal-status log information in Table 1 included in the terminal-side measurement data. The terminal-status log information is recorded only in a predetermined time (for example, within two minutes) that includes time of the foregoing measurement schedule.

TABLE 2

| Item |
|---|
| Call history |
| Setting of call waiting |
| Busy state |
| Setting of function mode |
| Setting of incoming rejection |
| Power-off |
| Out-of-service |
| Terminal freeze information |

Table 3 is a list showing one example of the terminal-existing serving-base-station quality information in Table 1, which is included in the terminal-side measurement data. This terminal-existing serving-base-station quality information is information relating to the terminal-existing serving-base-station in a cell (serving cell) within which the communication terminal apparatus 100 exists when conducting the measurements, and is recorded only during a predetermined time (for example, time within two minutes) including the foregoing time of measurement schedule.

TABLE 3

| Category | Item |
|---|---|
| Basic information | Physical cell ID (PCI) Cell ID (CI) Tracking area code (TAC) Type of connection network Center frequency Frequency band |
| Radio channel quality information | Received signal strength indicator (RSSI) Reference signal received power (RSRP) Received signal code power (RSCP) Reference signal received quality (RSRQ) Energy per chip to noise radio (Ec/No) Block error rate (BLER) Channel quality indicator (CQI) |

Table 4 is a list showing one example of the network-side measurement data capable of being obtained from the automatic voice response apparatus 410 and the data communication server 415.

TABLE 4

| Category | Item | Contents |
|---|---|---|
| Measurement schedule | Measurement time | Starting time, Ending time |
| | Schedule ID | Schedule management number |
| Network-side apparatus | Automatic voice response apparatus | Telephone number |
| | Server | IP address, server management number |
| Measurement contents | Voice communication quality | Connection raete of voice communication, Voice quality |
| | Data communication quality | Connection rate of data communication, Communication speed |
| | Measurement direction | Outgoing from terminal, Incoming to terminal |
| Network-side apparatus log information | (Refer to Table 5) | |

Table 5 is a list of one example showing the network-side apparatus log information in Table 4, which is included in the network-side measurement data. This network-side apparatus log information is recorded only during a predetermined time (for example, time within two minutes) including the foregoing time of measurement schedule.

TABLE 5

| Item |
|---|
| Successful termination |
| Line busy |
| Forcible disconnection |
| Disconnection by destination |
| No-response from destination |
| Apparatus error signal |
| Line error |

Table 6 is a list showing one example of the index values of communication quality calculated by the delivery and analysis server 420. In the present embodiment herein, at least one of these index values of communication quality is calculated.

TABLE 6

| Index of communication quality | Definition |
| --- | --- |
| (Total) connection rate | Successful connection count/Total measurement count |
| (Total) failed connection rate | Failed connection count/Total measurement count |
| Failure rate of connection | Failed connection count caused by network-side/ (Successful connection count + |
| (caused by network-side) | Failed connection count caused by network-side) |
| Out-of-service rate | Count of out-of-service of terminal/Total measurement count |
| Airplane-mode rate | Count of airplane mode of terminal/Total measurement count |
| Apparatus-failure rate | Count of apparatus failure/Total measurement count |
| Power-off rate | Count of power-off/Total measurement count |
| Presence or absence of forcible disconnection | Value indicating presence or absence of forcible disconnection (Call Drop) during communication |
| Voice quality value | MOS value indicating evaluation result of voice quality |
| Error rate | Error rate during communication (block error rate, bit error rate, packet loss rate, etc.) |

The foregoing index values of communication quality may be calculated with respect to a communication in any one direction of outgoing from the communication terminal apparatus 100 and incoming to the communication terminal apparatus 100, or may be calculated with respect to communications in both directions of outgoing from the communication terminal apparatus 100 and incoming to the communication terminal apparatus 100. The delivery of measurement condition, the communication via mobile communication network 200, and the acquisition of at least one of the terminal-side measurement data and network-side measurement data, which are described above, may be performed with respect to a plurality of communication terminal apparatuses 100, and the index value of communication quality may be calculated with respect to communications with the plurality of communication terminal apparatuses 100 via mobile communication network 200.

For example, each of the above-mentioned automatic voice response apparatus 410, data communication server 415 and delivery and analysis server 420 is configured by using hardwares such as a computer apparatus having an MPU, memories, etc., an external communication interface apparatus, a decoder being as necessary decoding means, and may be capable of performing various processes for communication quality evaluation by executing a predetermined program. When receiving from the communication terminal apparatus 100 a file of received voice data (digital signal) encoded by a predetermined coding scheme, the foregoing decoder can decode the received voice data using a predetermined decoding algorithm and generate a received voice signal (analog signal) that is a test voice signal received from the communication terminal apparatus 100.

It is noted herein that the foregoing delivery and analysis server 420 may be configured with a plurality of servers. For example, a delivery server of delivering the foregoing information including measurement condition and measurement contents and an analysis server of performing various processes relating to the evaluation of communication quality may be provided separately.

Some examples of communication quality measurements in the communication system according to the present embodiment will be then described.

Figure 2:
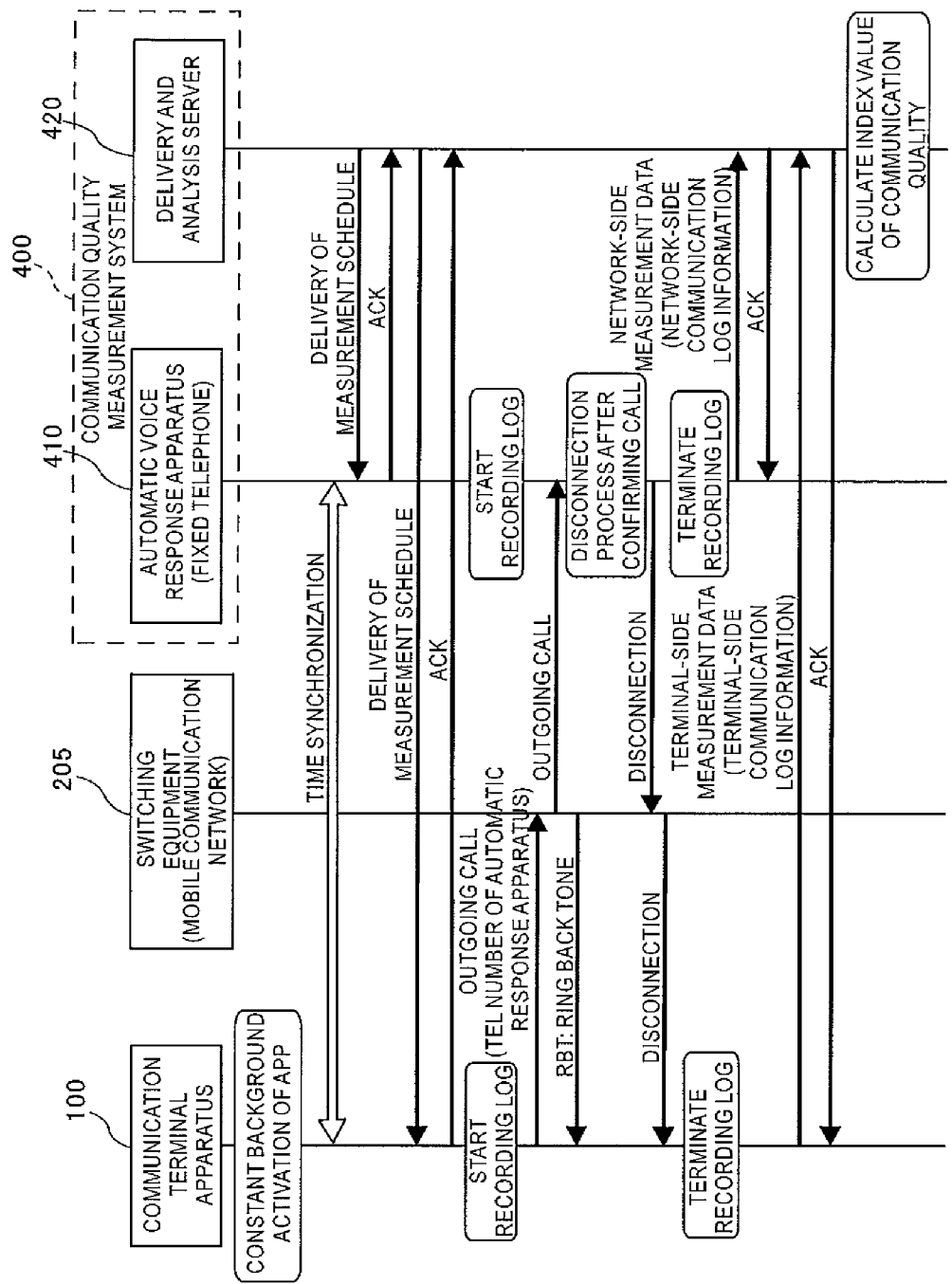
FIG. 2 is a sequence diagram showing one example of communication quality measurements for a voice communication in the direction of outgoing from a communication terminal apparatus in the communication system according to the present embodiment.

FIG. 2 is a sequence diagram showing one example of communication quality measurements for a voice communication in the direction of outgoing from a communication terminal apparatus 100 in the communication system according to the present embodiment. The present example is an example in which information including a measurement schedule that designates time for performing a communication quality measurement is delivered as measurement condition of the communication quality measurement.

In the example herein, a communication quality measurement app for performing a process of communication quality measurement is preinstalled in the communication terminal apparatus 100. The communication terminal apparatus 100 and automatic voice response apparatus 410 are mutually synchronized in time by using an NTP server, GPS signals, etc. Further, The communication terminal apparatus 100 is in a state of constant background operation with the communication quality measurement app activated in advance.

In FIG. 2, to begin with, the delivery and analysis server 420 transmits information of a predetermined measurement schedule as measurement condition designating a timing of communication quality measurement, to the communication terminal apparatus 100 and automatic voice response apparatus 410.

Table 7 shows one example of the information of measurement schedule transmitted from the delivery and analysis server 420. In the present example, 10:00 on Nov. 11, 2014 is designated as measurement time. This information of measurement schedule includes a schedule ID (schedule management number) for identifying and managing respective measurement schedule, and information of telephone number and type of the both of origination and destination for communication to measure a communication quality. As an option of measurement schedule, for example, information for designating an area in which a communication quality measurement is performed may be included. In this case, when the communication terminal apparatus 100 exists within the designated area, the communication quality measurement is performed at the timing when the designated measurement time comes.

TABLE 7

| | | Origination | | Destination | | |
| --- | --- | --- | --- | --- | --- | --- |
| Measurement time | Schedule ID | Telephone number | Type | Telephone number | Type | Option |
| 2014/11/11 10:00:00 | 1 | 080*** | Mobile | 0120*** | Fixed | Area name |

The communication terminal apparatus 100 starts recording a communication log for measuring a predetermined communication quality when the timing reached near the designated measurement time (10:00 on Nov. 11, 2014) comes, based on the information of measurement schedule received from the delivery and analysis server 420.

The automatic voice response apparatus 410 starts recording a communication log for measuring a predetermined communication quality when it comes to the timing reached near the measurement time (10:00 on Nov. 11, 2014) designated with the measurement schedule received from the delivery and analysis server 420. In the automatic voice response apparatus 410, the recording of communication log for communication quality measurement may be performed constantly.

The communication terminal apparatus 100 performs an automatic outgoing call for calling to the telephone number (0120********) of automatic voice response apparatus 410 designated as a destination on the aforementioned measurement schedule via switching equipment 205 of the mobile communication network 200 and the fixed-telephone network 300, when the foregoing predetermined measurement time (10:00 on Nov. 11, 2014) comes. When receiving the outgoing call from the communication terminal apparatus 100, the switching equipment 205 transmits a response of ringback tone to the communication terminal apparatus 100 and performs an outgoing call to the automatic voice response apparatus 410 via the fixed-telephone network 300 and mobile communication network 200. The telephone number of automatic voice response apparatus 410 may be preset in the communication quality measurement app.

When receiving the outgoing call from the switching equipment 205, the automatic voice response apparatus 410 performs an automatic disconnecting process after confirming the incoming call, transmits a disconnection signal to the communication terminal apparatus 100 via the switching equipment 205, and then, terminates recording the communication log. The network-side measurement data including the terminal-existing serving-base-station quality information recorded with the automatic voice response apparatus 410 is transmitted to the delivery and analysis server 420.

When receiving the disconnection signal from the switching equipment 205, the communication terminal apparatus 100 terminates recording the communication log. The terminal-side measurement data including the terminal-status log information recorded with the communication terminal apparatus 100 is transmitted to the delivery and analysis server 420. The disconnecting process of voice communication may be performed with the communication terminal apparatus 100, separating from the automatic voice response apparatus 410.

Table 8 shows one example of the terminal-side measurement data transmitted from the communication terminal apparatus 100 to the delivery and analysis server 420. In the present example, the terminal-side measurement data includes, in addition to a schedule ID, an outgoing time (10:00 on Nov. 11, 2014), a current location of the communication terminal apparatus 100, a moving speed, a telephone number of origination (self), a telephone number of destination, information on success or failure of connection and other information. Further, in the present example, as other information, a terminal-existing serving-base-station information of the communication terminal apparatus 100, etc. is included. It is noted that the terminal-side measurement data is not limited to the example in Table 8 and may include one part or all of the various data indicated in the foregoing Tables 1 to 3.

On the other hand, the automatic voice response apparatus 410 terminates recording the communication log after the automatic disconnecting process is performed by the communication terminal apparatus 100. This network-side measurement data including the terminal-existing serving-base-station quality information recorded with the automatic voice response apparatus 410 is transmitted to the delivery and analysis server 420.

Table 9 shows one example of the network-side measurement data transmitted from the automatic voice response apparatus 410 to the delivery and analysis server 420. In the present example, the network-side measurement data includes, in addition to a schedule ID, an incoming time (10:03 on Nov. 11, 2014), a telephone number of origination, a telephone number of destination (self), information on success or failure of connection and other information. Further, in the present example, as the other information, a signaling (PSTN/SS7 signal), etc. is included. It is noted that the network-side measurement data is not limited to the example in Table 9 and may include one part or all of the various data indicated in the foregoing Tables 4 and 5.

TABLE 9

| Schedule ID | Incoming time | Origination | Destination (self) | Success or failure of connection | Others |
|---|---|---|---|---|---|
| 1 | 2014/11/11 10:00:03 | 080*** | 0120*** | Success | PSTN/SS7 signal (signaling information) |

The delivery and analysis server 420 performs a process of communication quality analysis when receiving the terminal-side measurement data from the communication terminal apparatus 100 and the network-side measurement data from the automatic voice response apparatus 410. In this communication quality analysis, for example, the terminal-side measurement data and the network-side measurement data having a same schedule ID (schedule management number) are collated, and an index of communication quality in the communication of outgoing call for communication quality measurement from the communication terminal apparatus is calculated. As the index value of communication quality calculated herein, for example, at least one of a connection rate, a total failed connection rate, a failure rate of connection (caused by network-side), an out-of-service rate, an airplane-mode rate, an apparatus-failure rate, a power-off rate, a value indicating presence or absence of forcible disconnection (Call Drop), a voice quality value (MOS value) indicating an evaluation result of voice quality and an error rate during communication (block error rate, bit error rate, packet loss rate, etc.) for voice communication, which are listed in the foregoing Table 6, may be exemplified.

TABLE 8

| Schedule ID | Outgoing time | Existing location | Moving speed | Origination (self) | Destination | Success or failure of connection | Others |
|---|---|---|---|---|---|---|---|
| 1 | 2014/11/11 10:00:00 | Longitude/ Latitude (GPS) | 30 km/h | 080*** | 0120*** | Success | Terminal-existing serving-base-station information, etc. |

As described above, according to the example in FIG. 2, the measurement schedule is delivered from the delivery and analysis server 420 to the communication terminal apparatus 100 and the automatic voice response apparatus 410, as the measurement condition of communication quality measurement for a voice communication transmitted from the communication terminal apparatus 100. Consequently, with respect to the voice communication transmitted from the communication terminal apparatus 100, the measurement schedule of communication quality measurement can be set or changed easily and optionally, and then, while various communication quality measurements can be performed flexibly, the communication quality can be measured with high accuracy. For example, a cause of communication failure can be identified by collating the terminal-status log information with the terminal-existing serving-base-station quality information. Further, by designating the information of measurement condition, a concentration of communication quality data for a specific location can be prevented and communication quality data can be obtained under the condition (during a high speed moving, in the location with weak electromagnetic waves, etc.) by which a mobile communications service provider can obtain the expected data.

Furthermore, according to the example in FIG. 2, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 3:
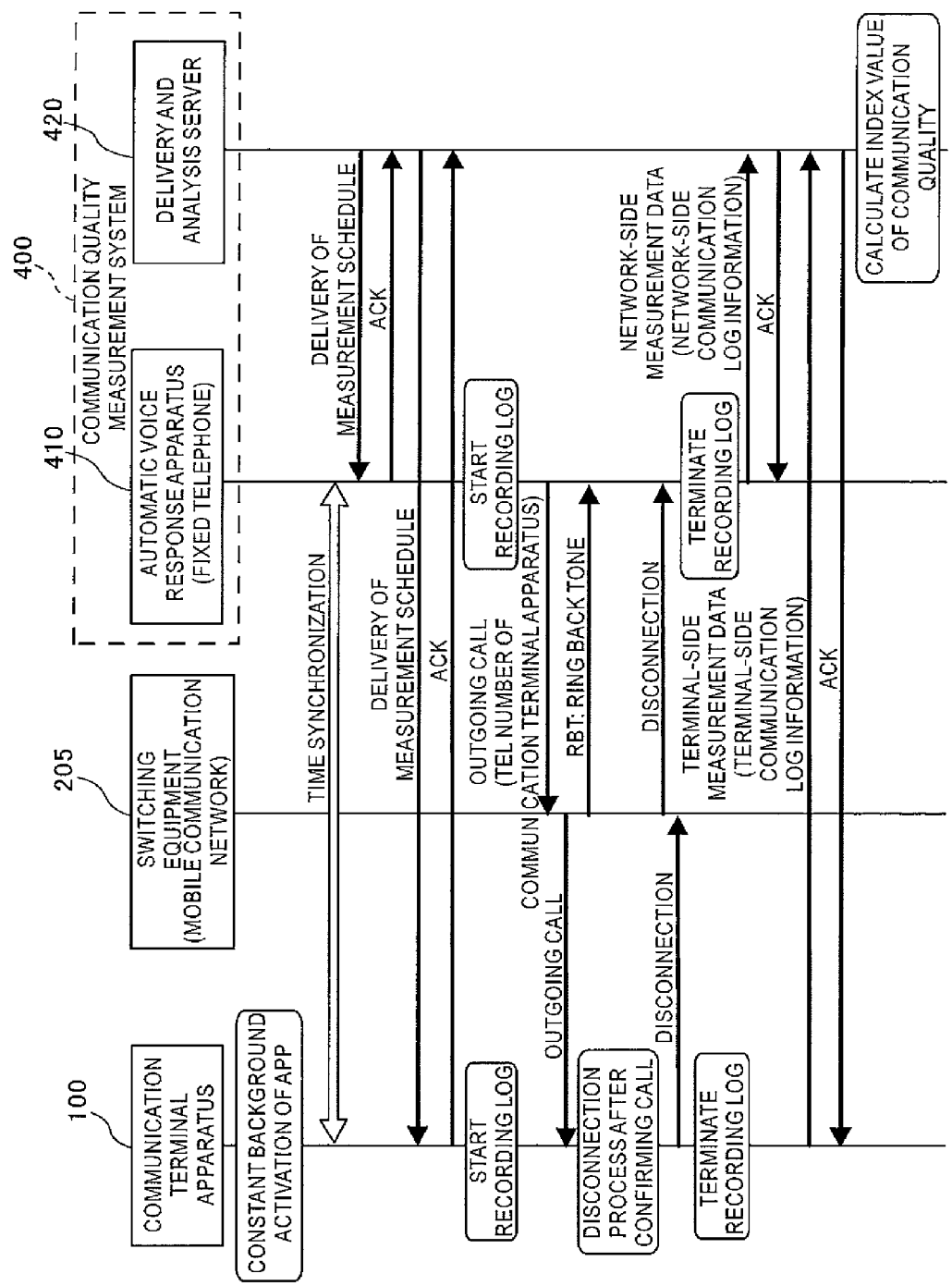
FIG. 3 is a sequence diagram showing one example of communication quality measurements for a voice communication in the direction of incoming to a communication terminal apparatus in the communication system according to the present embodiment.

FIG. 3 is a sequence diagram showing one example of communication quality measurements for a voice communication in the direction of incoming to the communication terminal apparatus 100 in the communication system according to the present embodiment. In the present example, a description of the same or substantially the same part as that of the aforementioned example in FIG. 2 will be omitted.

In FIG. 3, after the measurement schedule is delivered and the communication terminal apparatus 100 and the automatic voice response apparatus 410 start recording a communication log of communication quality measurement, when the foregoing predetermined measurement time (10:00 on Nov. 11, 2014) comes, the automatic voice response apparatus 410 starts recording a communication log for measuring a predetermined communication quality and performs an automatic outgoing call, via the mobile communication network 200 and the fixed-telephone network 300, to the telephone number (080\*\*\*\*\*\*\*\*) of communication terminal apparatus 100 designated as a destination on the foregoing measurement schedule.

When it comes to the timing reached near the measurement time (10:00 on Nov. 11, 2014) designated with the measurement schedule received from the delivery and analysis server 420, the communication terminal apparatus 100 starts recording a communication log for measuring a predetermined communication quality.

When receiving a disconnection signal from the communication terminal apparatus 100 via the switching equipment 205, the automatic voice response apparatus 410 terminates recording the communication log. The network-side measurement data including the terminal-existing serving-base-station quality information recorded with the automatic voice response apparatus 410 is transmitted to the delivery and analysis server 420. The disconnecting process of voice communication may be performed with the automatic voice response apparatus 410, separating from the communication terminal apparatus 100.

On the other hand, when receiving the outgoing call from the switching equipment 205, the communication terminal apparatus 100 performs an automatic disconnecting process after confirming the incoming call, transmits a disconnection signal to the automatic voice response apparatus 410 via the switching equipment 205, and then, terminates recording the communication log. The terminal-side measurement data including the terminal-status log information recoded with the communication terminal apparatus 100 is transmitted to the delivery and analysis server 420.

As described above, according to the example in FIG. 3, the measurement schedule is delivered from the delivery and analysis server 420 to the communication terminal apparatus 100 and the automatic voice response apparatus 410, as the measurement condition of communication quality measurement for a voice communication received by the communication terminal apparatus 100. Consequently, with respect to the voice communication received by the communication terminal apparatus 100, the measurement schedule of communication quality measurement can be set or changed easily and optionally, and then, as is the case of example shown in FIG. 2, while various communication quality measurements can be performed flexibly, the communication quality can be measured with high accuracy.

Figure 4:
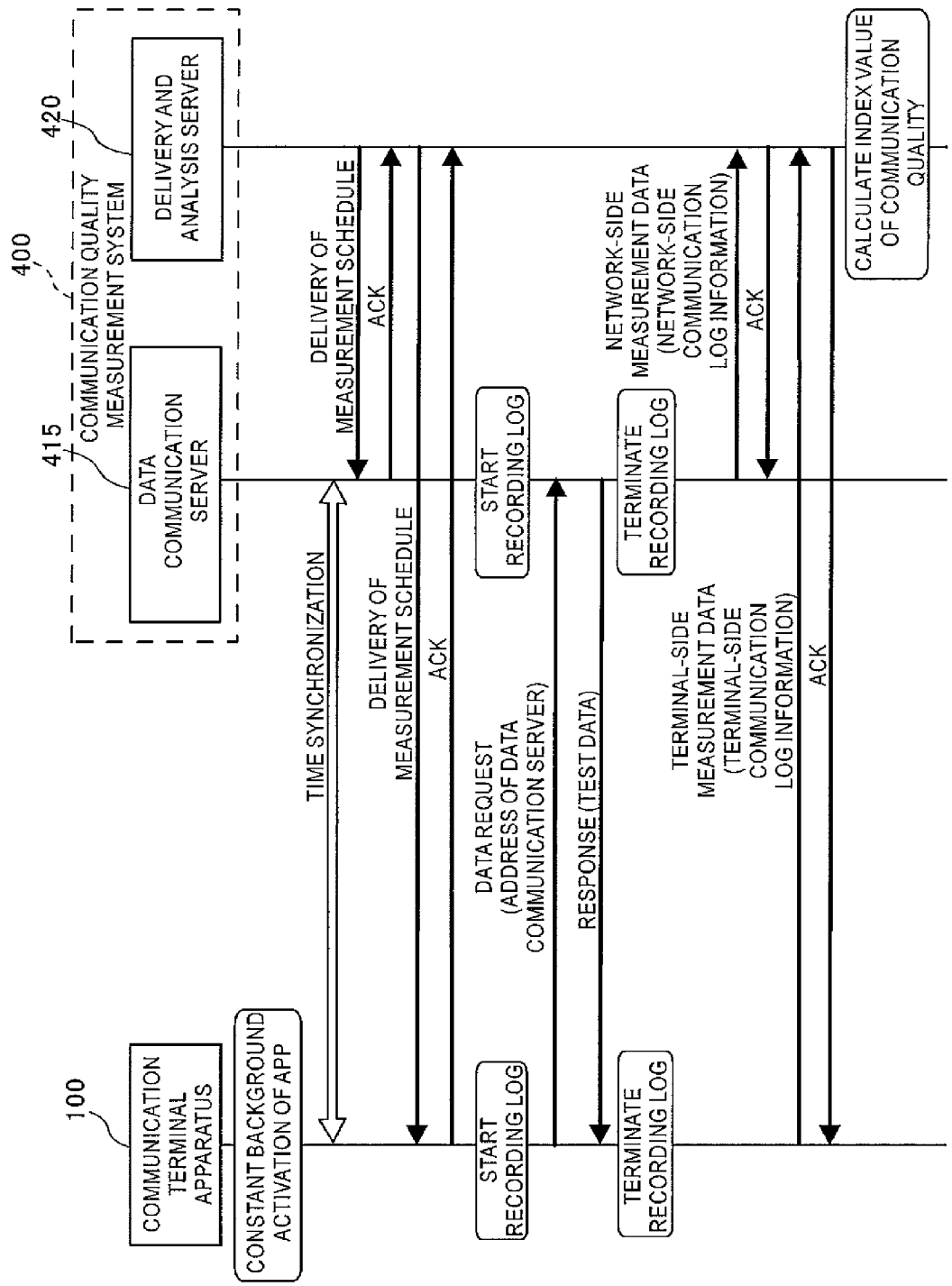
FIG. 4 is a sequence diagram showing one example of communication quality measurements for a data communication in downlink from a data communication server to a communication terminal apparatus in the communication system according to the present embodiment.

FIG. 4 is a sequence diagram showing one example of communication quality measurements for a data communication in downlink from the data communication server 415 to the communication terminal apparatus 100 in the communication system according to the present embodiment. In the present example, a description of the same or substantially the same part as that of the aforementioned example in FIG. 2 will be omitted.

In FIG. 4, to begin with, the delivery and analysis server 420 transmits information of a predetermined measurement schedule to the communication terminal apparatus 100 and the data communication server 415, as the measurement condition defining a timing of communication quality measurement. In the information of measurement schedule, respective addresses of an origination and a destination in an IP network established in the mobile communication network 200 are written as information of the origination and destination, instead of a telephone number.

When it comes to the timing reached near the designated measurement time (10:00 on Nov. 11, 2014), the communication terminal apparatus 100 starts recording a communication log for communication quality measurements based on the information of measurement schedule received from the delivery and analysis server 420.

Furthermore, when it comes to the timing reached near the measurement time (10:00 on Nov. 11, 2014) designated with on the measurement schedule received from the delivery and analysis server 420, the data communication server 415 starts recording a communication log for communication quality measurements. In the data communication server 415, the recording of communication log for communication quality measurements may be constantly performed.

When the foregoing predetermined measurement time (10:00 on Nov. 11, 2014) comes, the communication terminal apparatus 100 performs an automatic uplink communication of transmitting a data request to the address of data communication server 415 designated as the destination by the foregoing measurement schedule, via the mobile communication network 200. The address of data communication server 415 may be set in the communication quality measurement app in advance.

When receiving the data request from the communication terminal apparatus 100, the data communication server 415 transmits a response including the requested test data to the communication terminal apparatus 100 via the mobile communication network 200.

When receiving the response including the test data from the data communication server 415, the communication terminal apparatus 100 terminates recording the communication log. The terminal-side measurement data including the terminal-status log information recorded in the communication terminal apparatus 100 is transmitted to the delivery and analysis server 420.

On the other hand, after transmitting the response including the test data to the communication terminal apparatus 100, the data communication server 415 terminates recording the communication log. The network-side measurement data including the terminal-existing serving-base-station quality information recorded in the data communication server 415 is transmitted to the delivery and analysis server 420.

In the terminal-side measurement data and network-side measurement data of the present example, respective addresses of an origination and a destination in a IP network established in the mobile communication network 200 are written as information of the origination and destination, instead of a telephone number.

When receiving the terminal-side measurement data from the communication terminal apparatus 100 and the network-side measurement data from the data communication server 415, the delivery and analysis server 420 performs a process of communication quality analysis. In this communication quality analysis, for example, the terminal-side measurement data and the network-side measurement data having a mutually equal schedule ID (schedule management number) are collated, and an index of communication quality in the uplink data communication of requesting data from the communication terminal apparatus is calculated. The index value of communication quality calculated herein is, for example, at least one of a connection rate, a (total) failed connection rate, a failure rate of connection (caused by network-side), an out-of-service rate, an airplane-mode rate, an apparatus-failure rate, a power-off rate, a value indicating presence or absence of forcible disconnection (Call Drop), a voice quality value (MOS value) indicating an evaluation result of voice quality and an error rate during communication (block error rate, bit error rate, packet loss rate, etc.) for data communication, which are exemplified in the foregoing Table 6.

As described above, according to the example in FIG. 4, the measurement schedule is delivered from the delivery and analysis server 420 to the communication terminal apparatus 100 and the data communication server 415, as the measurement condition of communication quality measurement for a data communication in downlink from the data communication server 415 to the communication terminal apparatus 100. Consequently, with respect to the data communication in downlink from the data communication server 415 to the communication terminal apparatus 100, the measurement schedule of communication quality measurements can be set or changed easily and optionally, and then, as is the case of example shown in FIGS. 2 and 3, while various communication quality measurements can be performed flexibly, the communication quality can be measured with high accuracy.

Furthermore, according to the example in FIG. 4, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 5:
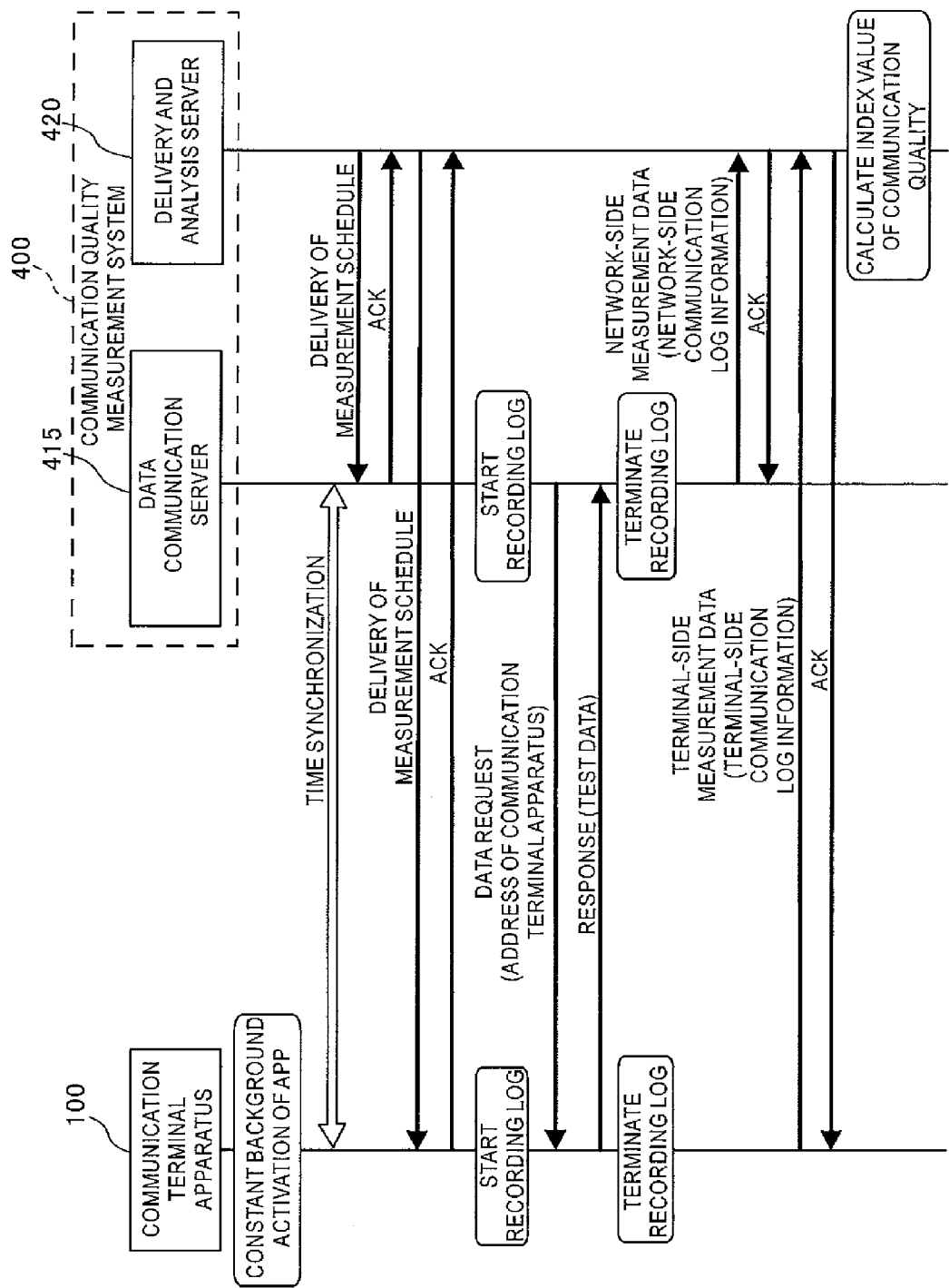
FIG. 5 is a sequence diagram showing one example of communication quality measurements for a data communication in uplink from a communication terminal apparatus to a data communication server in the communication system according to the present embodiment.

FIG. 5 is a sequence diagram showing one example of communication quality measurements for a data communication in uplink from the communication terminal apparatus 100 to the data communication server 415 in the communication system according to the present embodiment. In the present example, a description of the same or substantially the same part as that of the aforementioned examples in FIGS. 2 to 4 will be omitted.

In FIG. 5, after a measurement schedule is delivered and recordings of communication logs for communication quality measurements in the communication terminal apparatus 100 and the data communication server 415 are started, when the foregoing predetermined measurement time (10:00 on Nov. 11, 2014) comes, the data communication server 415 performs an automatic uplink communication of transmitting a data request to the address of communication terminal apparatus 100 designated as the destination by the foregoing measurement schedule, via the mobile communication network 200.

When receiving the data request from the data communication server 415, the communication terminal apparatus 100 transmits a response including the requested test data to the data communication server 415 via the mobile communication network 200.

When receiving the response including the test data from the communication terminal apparatus 100, the data communication server 415 terminates recording the communication log. The network-side measurement data including the terminal-existing serving-base-station quality information recorded in the data communication server 415 is transmitted to the delivery and analysis server 420.

On the other hand, after performing the process of transmitting the response including the test data to the data communication server 415, the communication terminal apparatus 100 terminates recording the communication log. The terminal-side measurement data including of the terminal-status log information recorded in the communication terminal apparatus 100 is transmitted to the delivery and analysis server 420.

As described above, according to the example in FIG. 5, the measurement schedule is delivered from the delivery and analysis server 420 to the communication terminal apparatus 100 and the data communication server 415, as the measurement condition of communication quality measurement for a data communication in uplink from the communication terminal apparatus 100 to the data communication server 415. Consequently, with respect to the data communication in uplink from the communication terminal apparatus 100 to the data communication server 415, the measurement schedule of communication quality measurements can be set or changed easily and optionally, and then, as is the case of example shown in FIGS. 2 to 4, while various communication quality measurements can be performed flexibly, the communication quality can be measured with high accuracy.

Acquisition controls of measurement data when the delivery and analysis server 420 acquires the terminal side measurement data from the communication terminal apparatus in the communication system according to the present embodiment will be then described.

In case that the delivery and analysis server 420 receives the terminal side measurement data recorded in the communication terminal apparatus 100, there is the following problem.

For example, there is a fear not to surely acquire the terminal side measurement data when the connection status of the communication terminal apparatus 100 to the mobile communication network 200 is not good. For example, there is a fear that the delivery and analysis server 420 is not capable of surely acquiring the terminal side measurement data when the communication terminal apparatus 100 locates out of a communication service range or locates at an end portion of a cell where radio signal strength is week and interference is apt to occur.

Furthermore, in case that the foregoing connection status is not good, while the communication terminal apparatus 100 repeats a re-transmitting process at every fixed time when the transmission of terminal side measurement data is failed, by this re-transmitting process, a radio communication resource in the mobile communication network 200 and/or a resource such as a battery in the communication terminal apparatus 100 are wastefully consumed.

Moreover, when the terminal side measurement data is transmitted by a control performed in the communication terminal apparatus 100 side, the delivery and analysis server 420 side is not capable of controlling an acquisition of the terminal side measurement data.

In the present embodiment, to solve these problems, the transmission of terminal side measurement data by the communication terminal apparatus 100 and the acquisition of terminal side measurement data by the delivery and analysis server 420 are controlled as shown in the following.

Figure 6:
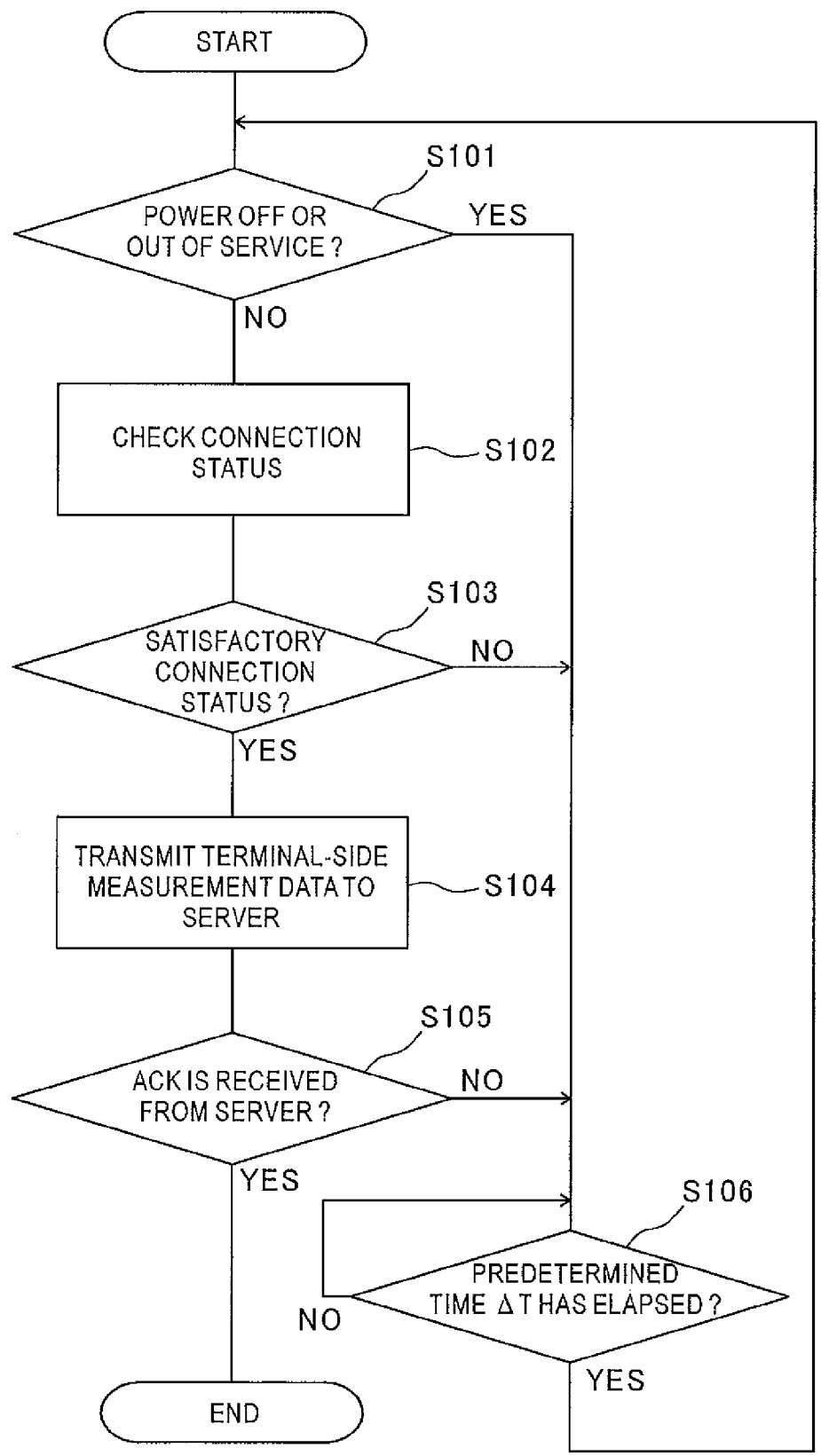
FIG. 6 is a flowchart showing one example of a transmission control of terminal-side measurement data in a communication terminal apparatus of the communication system according to the present embodiment.

FIG. 6 is a flowchart showing one example of a transmission control of terminal-side measurement data in a communication terminal apparatus of the communication system according to the present embodiment.

In FIG. 6, to begin with, the communication terminal apparatus 100 confirms that the power is not OFF (the power is ON) and the apparatus itself locates does not locate out of a communication service range of a cell (locate in the communication service range of the cell) (NO at S101), then check a connection status to the mobile communication network 200 (S102).

The foregoing connection status can be checked, for example, by acquiring network connection information indicating a connectable or non-connectable state to the mobile communication network 200, which is recorded at a predetermined timing by the communication terminal apparatus 100. When a predetermined information indicating that it is capable of connecting to the mobile connection network 200 is recorded as this network connection information, it can be determined that the communication status of the communication via the mobile connection network 200 is a satisfactory communication status capable of transceiving the terminal-side measurement data. The network connection information can be acquired as follows. For example, in case that an OS installed in the communication terminal apparatus 100 is Android (registered trademark) OS, the network information is acquired with a function of getActiveNetworkInfo( ) from a class of ConnectivityManager of standard. The network connection information indicating a connectable or non-connectable state to the mobile communication network 200 can be acquired from this network information with a function of isConnnect( ). As above-described, in case of using the network connection information in the communication terminal apparatus 100, the communication terminal apparatus 100 is not necessary to perform a communication to the mobile communication network 200 side when checking the foregoing connection status.

Furthermore, the foregoing connection status may be checked based on a value of parameter indicating a communication status such as a radio signal strength in a radio communication to a base station of the mobile communication network 200. For example, in case that the mobile communication standard in the communication terminal apparatus 100 is a standard based on the LTE (Long Term Evolution) standard, the connection status may be checked by comparing a value of RSRP (Reference Signal Received Power) with a predetermined threshold value. When the RSRP value is larger than the threshold value, or the RSRP value is equal to or larger than the threshold value, it can be determined to be a satisfactory connection status (communication status) capable of transceiving the terminal-side measurement data.

Moreover, in case that the mobile communication standard in the communication terminal apparatus 100 is a standard based on the WCDMA (registered trademark) (Wideband Code Division Multiple Access) standard, the connection status (communication status) may be checked by comparing a value of RSCP (Received Signal Code Power) with a predetermined threshold value. When the RSCP value is larger than the threshold value, or the RSCP value is equal to or larger than the threshold value, it can be determined to be a satisfactory connection status (communication status) capable of transceiving the terminal-side measurement data.

Further, in case that the mobile communication standard in the communication terminal apparatus 100 is a standard based on the CDMA/SGM (Global System for Mobiles) standard, the connection status (communication status) may be checked by comparing a value of ASU (Active Set Update) with a predetermined threshold value. When the ASU value is larger than the threshold value, or the ASU value is equal to or larger than the threshold value, it can be determined to be a satisfactory connection status (communication status) capable of transceiving the terminal-side measurement data.

Furthermore, the connection status (communication status) may be checked by comparing a length of antenna bar displayed on the display of communication terminal apparatus 100 with a predetermined threshold value. When the length of antenna bar is larger than the threshold value, or the length of antenna bar is equal to or larger than the threshold value, it can be determined to be a satisfactory connection status (communication status) capable of transceiving the terminal-side measurement data.

Next, when determining to be a satisfactory connection status (communication status) capable of transceiving the terminal-side measurement data (YES at S103), the communication terminal apparatus 100 transmits the terminal-side measurement data to the delivery and analysis server 420 (S104). Then, when receiving an ACK, which is an acknowledge signal from the delivery and analysis server 420 (YES at S105), it is determined that the terminal-side measurement data reaches normally to the delivery and analysis server 420 and the process control terminates.

On the other hand, when determining to be power-off or out-of-service (YES at S101), when determining that it is not a satisfactory communication status (NO at S103), and when not receiving a ACK that is an acknowledge signal from the delivery and analysis server 420 (NO at S105), the communication terminal apparatus 100 performs a re-transmitting process of the terminal-side measurement data after a predetermined waiting time Δ T elapses (YES at S106).

As described above, according to the transmission control of the terminal-side measurement data exemplified in FIG. 6, the communication terminal apparatus 100 transmits the terminal-side measurement data to the delivery and analysis server 420, when it is a satisfactory connection status (communication status) capable of transceiving the terminal-side measurement data. Accordingly, the delivery and analysis server 420 can surely acquired the terminal-side measurement data used for communication quality measurements from the communication terminal apparatus 100. Furthermore, since the communication terminal apparatus 100 does not perform a process of transmitting the terminal-side measurement data in case that it is not a satisfactory connection status (communication status), it is capable of preventing wasteful consumption of a resource of radio communication in the mobile communication network 200 and/or a resource such as a battery in the communication terminal apparatus 100.

Figure 7:
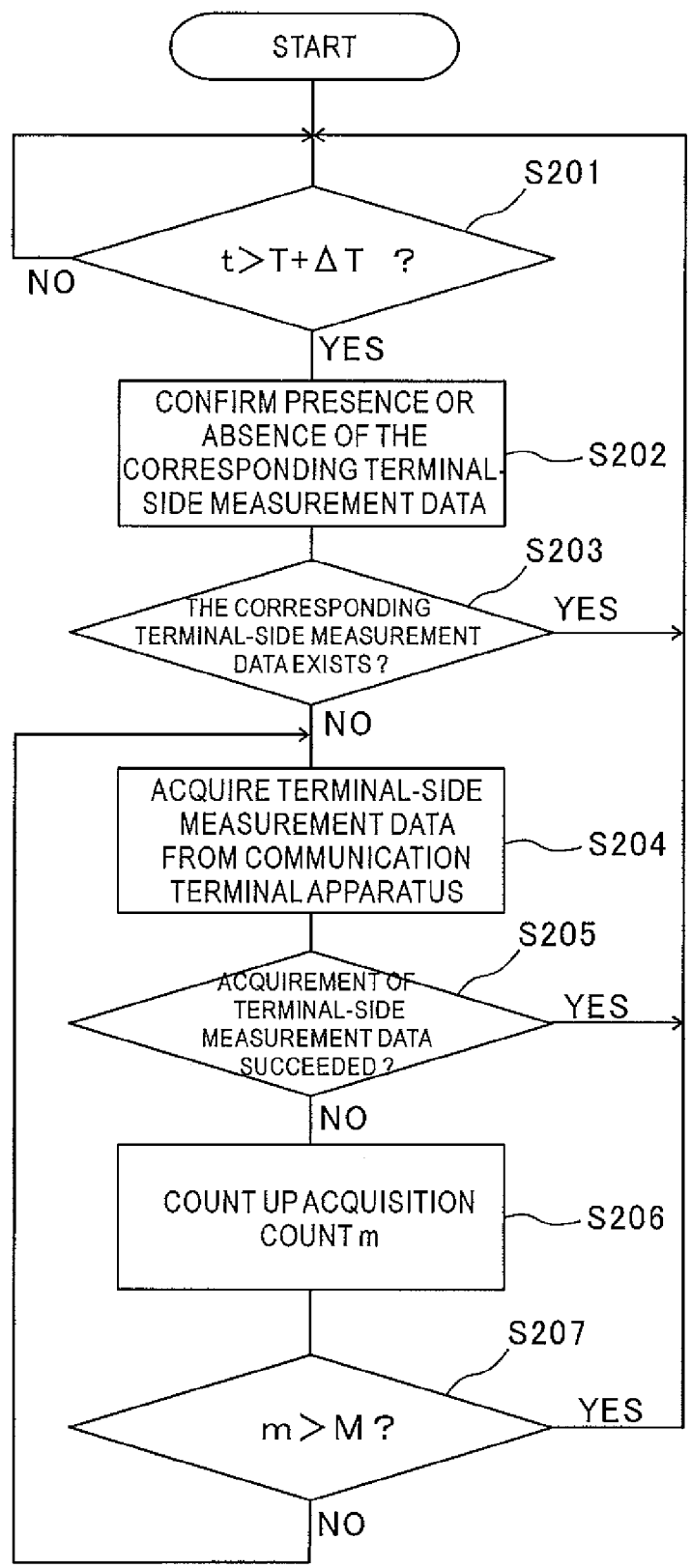
FIG. 7 is a flowchart showing one example of an acquisition control of terminal-side measurement data in a delivery and analysis server of the communication system according to the present embodiment.

FIG. 7 is a flowchart showing one example of an acquisition control of terminal-side measurement data in the delivery and analysis server 420 of the communication system according to the present embodiment. The t in the figure is a current time and the T is a time of measurement schedule corresponding to a transmission timing of the terminal-side measurement data. The ΔT is a time parameter of a predetermined time preset in advance by considering a process time of the terminal-side measurement data in the communication terminal apparatus 100, a transmission delay time in the mobile communication network 200 and so on. The m is a variable of acquisition count counted up when performing repeatedly an acquisition process with respect to one terminal-side measurement data, and the M is a threshold value to be compared with the value of m.

In FIG. 7, with respect to one communication terminal apparatus 100, when a current time t satisfies t>T+ΔT, that is, when a predetermined time Δt elapses from the time (transmission timing) of measurement schedule (YES at S201), the delivery and analysis server 420 confirms the presence or absence of the corresponding terminal-side measurement data in a memory apparatus in the server itself (S202).

When the corresponding terminal-side measurement data does not exist (NO at S203), the delivery and analysis server 420 performs an acquisition process of the corresponding terminal-side measurement data by transmitting an acquisition request of requesting the terminal-side measurement data to the corresponding communication terminal apparatus 100 (S204). When failing in the acquisition process of the terminal-side measurement data (NO at S205), the acquisition process of the terminal-side measurement data is repeatedly performed M times (S204-S207).

On the other hand, when the corresponding terminal-side measurement data exists in the memory apparatus in the server itself (YES at S203), when the acquisition process of the corresponding terminal-side measurement data is succeeded (YES at S205) and when the acquisition process of the terminal-side measurement data is failed even if the acquisition process of the terminal-side measurement data is repeated M times (YES at S207), the delivery and analysis server 420 transfers to the acquisition process of the terminal-side measurement data, which corresponds to a time of next measurement schedule.

It is noted that the foregoing process in FIG. 7 may be a parallel processing simultaneously performed for two or more communication terminal apparatuses. For example, when a current time t satisfies t>T+ΔT, that is, when a predetermined time Δt elapses from the time T of measurement schedule, the delivery and analysis server 420 confirms the presence or absence of the corresponding terminal-side measurement data for each of the two or more communication terminal apparatuses in a memory apparatus in the server itself. Then, with respect to a communication terminal apparatus for which any terminal-side measurement data has not received, among the two or more communication terminal apparatuses, the delivery and analysis server 420 may perform the foregoing processes of S204-S207 in FIG. 7.

As described above, according to the acquisition process of terminal-side measurement data exemplified in FIG. 7, the delivery and analysis server 420 is capable of acquiring the terminal-side measurement data from the communication terminal apparatus 100 at a predetermined timing that is set and controlled by the server side. Furthermore, the delivery and analysis server 420 performs the acquisition process by transmitting the acquisition request to the communication terminal apparatus 100 only with respect to a terminal-side measurement data that is not acquired yet. Accordingly, it is capable of preventing a needless control in the delivery and analysis server 420 and the communication terminal apparatus 100 and preventing wasteful consumption of a resource of radio communication in the mobile communication network 200 and/or a resource such as a battery in the communication terminal apparatus 100.

It is noted that, although the index value is calculated by using both of the terminal-side measurement data and the network-side measurement data in the aforementioned embodiment, the index value may be calculated by using any one of the terminal-side measurement data and the network-side measurement data.

Furthermore, although it is described with respect to the case in which the measurement condition delivered from the delivery and analysis server 420 is the measurement schedule designating a time of measuring the communication quality in the aforementioned embodiment, a measurement condition other than the measurement schedule may be delivered if the measurement condition can define a timing of performing a communication quality measurement. For example, a condition designating a location (for example, area name, cell ID, etc.) where the communication terminal apparatus 100 executing a communication quality measurement exits may be delivered.

Moreover, in the aforementioned embodiment, the foregoing measurement schedule may be changed based on at least one of terminal-identification information (for example, telephone number) of the communication terminal apparatus 100, a communication history of the communication terminal apparatus 100, a type/model of the communication terminal apparatus 100, a current location (GPS position, area, serving cell, etc.) of the communication terminal apparatus 100, a time period (a weekday/holyday, day of week, early morning/daytime/nighttime), a moving speed (for example, low speed during moving on foot, high speed during moving by car, train or the like) of the communication terminal apparatus 100, information on a communications service provider of the mobile communication network 200 and communication quality (for example, receiving SINR) in the communication terminal apparatus 100.

For example, when it is determined that the communication terminal apparatus 100 locates in an event site of a festival, a display of fireworks, etc. where many communication terminal apparatuses exist around there with high probability, based on the information of current location of the communication terminal apparatus 100, the foregoing measurement schedule may be changed so as to cancel the communication quality measurement or restrict the number of the communication quality measurements in the time period during the course of the event. In the case that the moving speed of communication terminal apparatus 100 is high speed that is higher than a predetermined threshold such as the case of moving by a train or the like, the foregoing measurement schedule may be changed so as to cancel the communication quality measurement. In the case that the communication terminal apparatus 100 is in the resting state, the foregoing measurement schedule may be changed so as to restrict the number of the communication quality measurements.

Further, the present system may be configured so as to have an automatic learning function of sequentially learning and updating the foregoing measurement schedule for each of the communication terminal apparatus 100, and the measurement time of communication quality measurement recently performed may be preferentially set as a measurement time for next communication quality measurement for each of the communication terminal apparatus 100.

By setting and changing the foregoing measurement schedule, for example, communication quality measurements for the mobile communication network 200 in a specific time period and/or a specific place can be performed, and/or the communication quality measurements can be performed with respect to a specific type/model of communication terminal apparatus.

Furthermore, with respect to the foregoing measurement schedule, a measurement time may be randomly set.

Moreover, the communication terminal apparatus 100 and the network-side apparatuses may record and create the communication log and perform the communication quality measurements, in accordance with a similar policy (rule) of measurement schedule. For example, a time (start time of measurement) of starting a communication quality measurement may be determined, the communication log may be recorded and created and the communication quality measurement may be performed, based on a measurement schedule for repeating the communication quality measurement at regular time intervals (for example 1 hour) from the start time of measurement.

It is noted that process steps and configuration elements in each of the communication terminal apparatus 100, the automatic voice response apparatus 410, the data communication server 415, the delivery and analysis server 420, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, a code such as a procedure, a function, a module, an instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

100 communication terminal apparatus
200 mobile communication network
210 base station
300 fixed-telephone network
400 communication quality measurement system
410 automatic voice response apparatus
415 data communication server
420 delivery and analysis server
500 Internet
510 access-point apparatus
600 contents providing server
610 NTP server

The invention claimed is:

1. A method of measuring communication quality, comprising:
 confirming a connection status of a communication terminal apparatus to a mobile communication network when a timing of transmitting a measurement data of the communication terminal apparatus side from the communication terminal apparatus to a server comes, wherein the measurement data is used for a communication quality measurement of a communication via the mobile communication network by the communication terminal apparatus;

transmitting the measurement data from the communication terminal apparatus to the server when determining that it is a status capable of transceiving the measurement data, based on a confirmation result of connection status, while not transmitting the measurement data from the communication terminal apparatus to the server when determining it is not a status capable of transceiving the measurement data; and measuring a communication quality in the communication via the mobile communication network based on the measurement data received by the server from the communication terminal apparatus;

delivering information including a measurement condition for measuring communication quality;

performing a communication via the mobile communication network by the communication terminal apparatus at the timing satisfying the measurement condition; and recording the measurement data of communication terminal apparatus side corresponding to the communication at a predetermined timing by the communication terminal apparatus.

2. The method according to claim 1, wherein the communication quality in the communication via the mobile communication network is measured based on the measurement data of the communication terminal apparatus side received by the server from the communication terminal apparatus and a measurement data of the server side used for a communication quality measurement of a communication by the communication terminal apparatus via the mobile communication network.

3. The method according to claim 1, comprising:
confirming the connection status of the communication terminal apparatus to a mobile communication network when a re-transmitting timing for performing a re-transmitting process of the measurement data comes, in case that the measurement data of communication terminal side is not transmitted from the communication terminal apparatus to the server; and performing the re-transmitting process of the measurement data from the communication terminal apparatus to the server when determining it is a status capable of transceiving the measurement data based on the confirmation result of connection status, while not performing the re-transmitting process of the measurement data from the communication terminal apparatus to the server when determining it is not a status capable of transceiving the measurement data.

4. The method according to 1, comprising confirming the connection status based on at least one kind of information on a power ON/OFF of the communication terminal apparatus, information on an operation mode of the communication terminal apparatus and information on intensity of a radio signal from the mobile communication network.

5. The method according to 1, comprising:
requesting the measurement data of communication terminal apparatus side from the server to the communication terminal apparatus; and
transmitting the measurement data from the terminal apparatus to the server.

6. The method according to claim 5, comprising:
confirming whether the measurement data reaches to the server from the communication terminal apparatus or not when a predetermined time elapses from the timing of transmitting the measurement data of communication terminal apparatus side; and requesting the measurement data from the server to the communication terminal apparatus when the measurement data is not reached.

7. The method according to claim 1, wherein the measurement condition for measuring communication quality comprises at least one kind of information on a measurement schedule designating a time of measuring the communication quality, a measurement area designating a location of the communication terminal apparatus when measuring the communication quality and a moving speed in measurement designating a moving speed of the communication terminal apparatus when measuring the communication quality.

8. The method according to claim 1,
wherein measuring the communication quality comprises calculating an index value of communication quality, and
wherein the index value of communication quality is at least one of a successful connection rate, a failed connection rate, an out-of-service rate, an airplane-mode rate, an apparatus-failure rate, a power-off rate, a presence or absence of forcible disconnection, a value of evaluation result of voice quality and an error rate of the communication terminal apparatus in the mobile communication network.

9. The method according to claim 1, wherein the communication of measuring the communication quality is a voice communication or a data communication via the mobile communication network.

10. A system that measures communication quality in a mobile communication network, comprising:
a server that provides a measurement condition indicating conditions for measuring communication quality; and
a communication terminal apparatus that communicates with the server, the communication terminal including a main controller that confirms a connection status of the communication terminal apparatus to the mobile communication network when timing of transmitting measurement data of the communication terminal apparatus side from the communication terminal apparatus to the server is received, wherein the measurement data is used for a communication quality measurement of communication via the mobile communication network using the communication terminal apparatus and including a wireless signal processing section that transmits the measurement data from the communication terminal apparatus to the server only when determining that the communication terminal apparatus is capable of transceiving the measurement data, based on the confirmation result of connection status, and wherein the server determines communication quality of the mobile communication network based on the measurement data received by the server from the communication terminal apparatus and wherein the communication terminal communicates via the mobile communication network at a time satisfying the measurement condition and records the measurement data at a predetermined timing.

11. The system according to claim 10, wherein the server measures the communication quality in the communication via the mobile communication network based on the measurement data of the communication terminal apparatus side received by the server from the communication terminal apparatus and a measurement data of the server side used for a communication quality measurement of a communication by the communication terminal apparatus via the mobile communication network.

12. The system according to claim 10, wherein the communication terminal apparatus confirms the connection status of the communication terminal apparatus to the mobile communication network when a re-transmitting timing for performing a re-transmitting process of the measurement data comes, in case that the measurement data of communication terminal side is not transmitted from the communication terminal apparatus to the server and performs the re-transmitting process of the measurement data from the communication terminal apparatus to the server when determining it is a status capable of transceiving the measurement data based on the confirmation result of connection status, while not performing the re-transmitting process of the measurement data from the communication terminal apparatus to the server when determining it is not a status capable of transceiving the measurement data.

13. The system according to claim 10, wherein the communication terminal apparatus confirms the connection status based on at least one kind of information on a power ON/OFF of the communication terminal apparatus, information on an operation mode of the communication terminal apparatus and information on intensity of a radio signal from the mobile communication network.

14. The system according to claim 10,
wherein the server comprises requests the measurement data of communication terminal apparatus side to the communication terminal apparatus, and
wherein the communication terminal apparatus transmits the measurement data to the server based on the request.

15. The system according to claim 14,
wherein the server confirms whether the measurement data reaches to the server from the communication terminal apparatus or not when a predetermined time elapses from the timing of transmitting the measurement data of communication terminal apparatus side, and
wherein the measurement data is requested from the server to the communication terminal apparatus when the measurement data is not reached.

16. The system according to claim 10, wherein the measurement condition for measuring communication quality comprises at least one kind of information on a measurement schedule designating a time of measuring the communication quality, a measurement area designating a location of the communication terminal apparatus when measuring the communication quality and a moving speed in measurement designating a moving speed of the communication terminal apparatus when measuring the communication quality.

17. The system according to claim 10,
wherein the server calculates a index value of communication quality, and
wherein the index value of communication quality is at least one of a successful connection rate, a failed connection rate, an out-of-service rate, an airplane-mode rate, an apparatus-failure rate, a power-off rate, a presence or absence of forcible disconnection, a value of evaluation result of voice quality and an error rate of the communication terminal apparatus in the mobile communication network.

18. The system according to claim 10, wherein the communication of measuring the communication quality is a voice communication or a data communication via the mobile communication network.

19. A communication terminal apparatus, comprising:
a main controller that confirms a connection status of the communication terminal apparatus to a mobile communication network when timing of transmitting measurement data of the communication terminal apparatus side from the communication terminal apparatus to the server is received, wherein the measurement data is used for a communication quality measurement of communication via the mobile communication network using the communication terminal apparatus; and
a wireless signal processing section that transmits the measurement data from the communication terminal apparatus to a server only when determining that the communication terminal apparatus is capable of transceiving the measurement data, based on the confirmation result of connection status, wherein the server determines communication quality of the mobile communication network based on the measurement data received by the server from the communication terminal apparatus and wherein the communication terminal communicates via the mobile communication network at a time satisfying the measurement condition and records the measurement data at a predetermined timing.

20. The communication terminal apparatus according to claim 19, wherein the communication of measuring the communication quality is a voice communication or a data communication via the mobile communication network.

* * * * *